United States Patent [19]

Nowak et al.

[11] Patent Number: 5,383,014

[45] Date of Patent: Jan. 17, 1995

[54] PHOTORECEPTOR BELT MOTION SENSOR USING LINEAR POSITION SENSORS

[75] Inventors: William J. Nowak; Daniel W. Costanza, both of Webster; Edward A. Powers, Penfield, all of N.Y.

[73] Assignee: Xerox Corporation, Stamford, Conn.

[21] Appl. No.: 63,796

[22] Filed: May 20, 1993

[51] Int. Cl.⁶ .............. G01P 3/36; G01N 21/86; G03G 21/00; B65G 43/00

[52] U.S. Cl. ................................. 356/28; 250/571; 198/301; 198/502.4; 355/308; 356/373

[58] Field of Search ............... 355/308; 356/28, 373; 250/571, 231.16; 198/502.4, 301

[56] References Cited

U.S. PATENT DOCUMENTS

| | | |
|---|---|---|
| 3,598,493 | 8/1971 | Fisher . |
| 3,838,250 | 9/1974 | Naas et al. ................... 197/187 |
| 4,518,856 | 5/1985 | Blackington ................. 250/557 |
| 4,667,098 | 5/1987 | Everett . |
| 4,837,636 | 6/1989 | Daniele et al. ............... 358/300 |
| 5,204,620 | 4/1993 | Costanza et al. ............ 324/175 |
| 5,259,544 | 11/1993 | Hashimoto ................... 355/308 |
| 5,264,872 | 11/1993 | Wong ........................... 355/200 |

Primary Examiner—Stephen C. Buczinski

[57] ABSTRACT

The velocity of a photoreceptor belt is measured by sensing the passing of illuminated slits in the belt, as the belt moves in a process direction. Two linear position sensors are positioned so as to view the passing of the illuminated slits. The sensors are aligned in a staggered configuration so that there is an overlap region. The slits are positioned so that as one slit is moving off of a downstream sensor, a second slit is moving over the upstream sensor. The output from an illuminated sensor is alternately switched to the second sensor. The sensor outputs are differentiated to provide an output signal representing a belt velocity. The velocity is compared to said velocity in the belt drive system and error signals generated to compensate for detected changes in the belt velocity.

7 Claims, 5 Drawing Sheets

PHOTORECEPTOR BELT MOTION SENSOR USING LINEAR POSITION SENSORS

BACKGROUND AND MATERIAL DISCLOSURE STATEMENT

The present invention relates to a motion sensor for sensing the velocity of a moving web or belt and, more particular, to a motion sensor which uses a pair of linear position sensors to detect the passage of holes formed in the circumference of a photoreceptor belt to measure the velocity of the belt.

Highlight color and full color printers may use one or more imagers, such as Raster Output Scanners (ROS) or LED print bars, to expose the surface of a photoreceptor belt to form a plurality of superimposed color images. For the highlight color case, two exposures are made on the same exposure frame, or pitch, of the belt. Each exposure is developed with a characteristic color plus black. For a full color image, a single imager, in a multi-pass mode, or a plurality of imagers, in a single pass mode, form successive color images on successive exposure frames with a composite color image being developed and transferred to a copy sheet. Each color image must be registered with previously exposed and developed images with a high degree of accuracy. One source of registration error is velocity variations in the rotational velocity of the photoreceptor belt. A number of factors can contribute to changes in the photoreceptor velocity from a velocity at start of operation such as: variations in the speed of the belt drive motor; runout errors of the drive and tension idler roller; cleaning blade to photoreceptor surface interaction and belt thickness variations. These belt velocity variations cause the spacing between scan lines being formed by the imager on the photoreceptor surface to vary resulting in a visible "banding" effect in the output copies. Also, for a single pass color system, where three or four images are successively formed in a single revolution or pass of the photoreceptor, the leading edge of each exposure frame may vary from the precise registration requirements, It is therefore evident that there exists a need for some mechanism for monitoring the velocity of the belt in the process direction and for correcting for noted changes in the measured velocity.

There are several prior art references which disclose belt sensing and registration correction techniques. The most generally used mechanism is to mount an encoder in contact with a portion of the belt. The encoder provides a series of pulses per revolution, each pulse representative of an incremental distance of belt movement. The encoder outputs are sent to a drive servo control via a feedback loop; the servo control detects changes in the velocity of the belt and adjusts the motor drive of the belt. See, for example, U.S. Pat. No. 4,485,982 for an encoder used in a belt tracking system.

Encoders and related circuitry are expensive components; other less expensive techniques have been developed to produce signals representing the velocity of the belt or web. U.S. Pat. No. 4,837,636 discloses a system in which a belt is formed with a series of holes along one edge. The holes are illuminated and cause a CCD sensor array beneath the belt to be continually illuminated by the light source. Output signals from the sensor array are converted into clock signals which are used for controlling the belt drive motor velocity. U.S. Pat. No. 5,204,620 discloses a plurality of rectangular slits formed along the edge of the belt. The slits are illuminated and flux is incident on a segmented CCD position sensor on the other side of the belt. The sensor light output is sampled and the output during the sampling period is operated upon by a centroid processor to accurately determine the center of movement for each sampled intensity distribution. These prior art devices utilize CCD sensor arrays which, while less expensive than the encoder arrangements, are still a relatively expensive component.

The present invention is directed towards a mechanism for measuring velocity by using relatively inexpensive linear position sensors. In the embodiment which is used to disclose the sensor arrangement, narrow belt slits are formed in a belt in a cross-process direction and a light source is provided which illuminates the full width of the slits as well as the combined lengths of a pair of linear position sensors joined in a staggered arrangement. The light passing through the slits as they advance over the staggered sensor arrays provide output signals over time which represent the photoreceptor velocity. More particularly, the present invention relates to a printer having a photoreceptor belt moving in a process direction, said belt having a series of slits spaced from each other and extending in a row about the circumference of the belt with the length of said slits aligned in a direction generally perpendicular to said process direction, the combination of:

a sensor system for measuring the velocity of said belt, said sensor system including a pair of linear position sensors adjacent one surface of the belt, said sensors constructed in a staggered configuration to provide a continuous length longer than the length of either sensor while shorter than the slit spacing, said sensors aligned so that their lengths are generally parallel to the process direction, and an illumination source positioned on the other side of the belt and adapted to provide a band of illumination which illuminates the length of said slits and the combined length of said sensors, drive means for rotating said belt so as to move said slits across the combined length of said sensors to allow a continuous band of illumination from said light source to fall on said sensors, switching means for switching the operational state of said sensors as a function of the position of said slit and the output voltage of said sensors so that output signals are alternately generated by each sensor, and circuit means for differentiating said sensor output signals to produce a signal representing the velocity of the belt.

DESCRIPTION OF THE INVENTION

Figure 1:
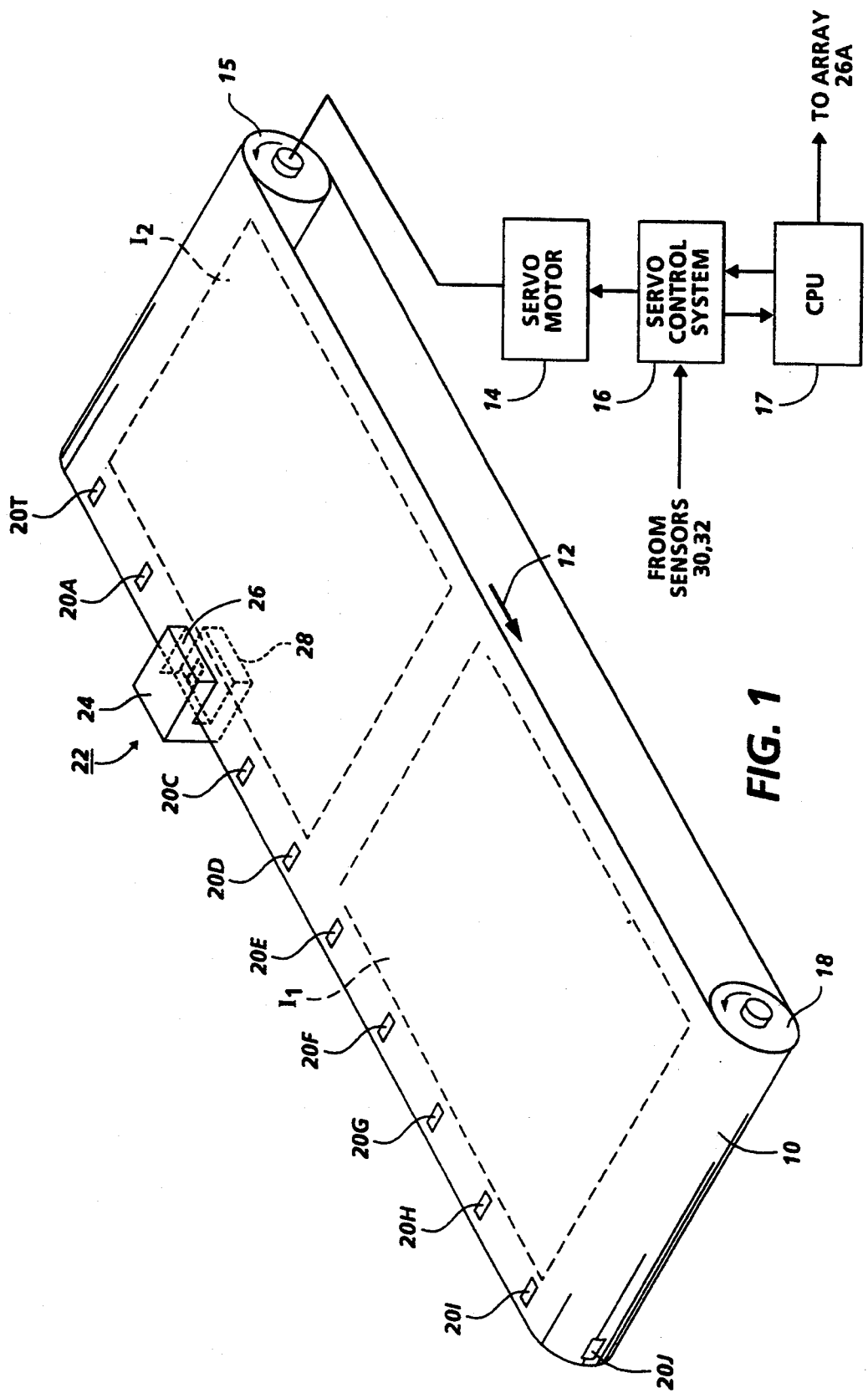
FIG. 1 is a top perspective view of an imaging system incorporating the belt velocity sensing mechanism of the present invention.

FIG. 1 shows, in top perspective view, one embodiment of a color printer in which the sensor mechanism of the present invention can be used. A photoreceptor belt 10 is imaged to form multiple registered images on exposure image frames, or pitches, extending around the belt circumference. For the belt shown, form A4 exposure frames are available for imaging; only two frames $I_1$ and $I_2$ are shown. The remaining two frames are on the underside of the belt. The belt is charged and frames $I_1$ and $I_2$ are exposed in a scanned image pattern by one or more imagers such as a Raster Output Scanner (ROS) or a linear LED print bar array. Development of each exposed image and transfer of the composite image is accomplished by techniques known in the art. Details of a ROS operating system are disclosed in U.S. Pat. No. 5,175,570 and co-pending application, U.S. Ser. No. 07/807,927, assigned to the same assignee as the present invention. The contents of these applications are hereby incorporated by reference. The belt 10 is driven in the direction of arrow 12 by servo drive motor 14 and driving roller 15. Servo control system 16 under control of Central Processing Unit (CPU) 17 drives the belt at some initial velocity $V_t$. This velocity is maintained by measuring the belt speed and providing signals representing belt speed to the servo control system 16, as will be seen. The belt tension is taken up by roller 18. It is assumed that an initial alignment has registered each successive exposed image with the desired process direction registration tolerances; e.g. each scan line which cumulatively formed the exposed images within each image frame $I_1$ and $I_2$ is formed with the same line spacing and the first image scan line of frame $I_1$ and $I_2$ is registered. It then becomes the requirement to maintain this initial registration.

According to the present invention, a plurality of narrow slits 20A–20T are formed along the edge of the belt outside of the image exposure frames. These slits extend around the belt circumference and are aligned in a row parallel to the process direction (parallel to the direction of belt travel indicated by arrow 12). Located at some point along the belt travel is a horseshoe-shaped sensor assembly 22. The upper leg 24 of assembly 22 contains a light source 26 which is partially surrounded by reflector 26B. The light source 26A is powered from a power source contained in CPU 17. The lower leg 28 of assembly 22 mounts a pair of linear position sensors 30, 32, in a staggered orientation shown in partial top view in FIG. 2, side view in FIG. 4 and cross-sectional view in FIG. 3.

Figure 2:
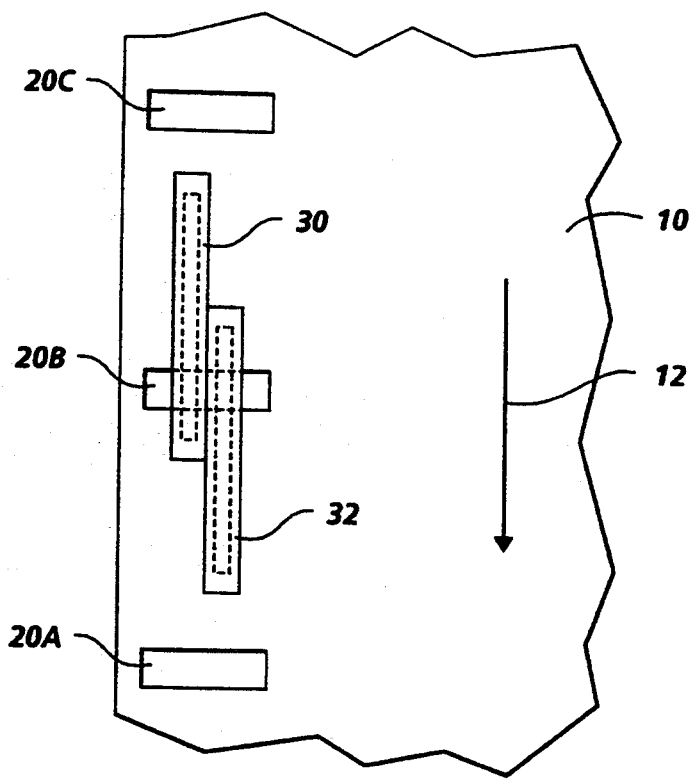
FIG. 2 is a partial top view of the belt velocity sensing mechanism shown in FIG. 1.
Figure 3:
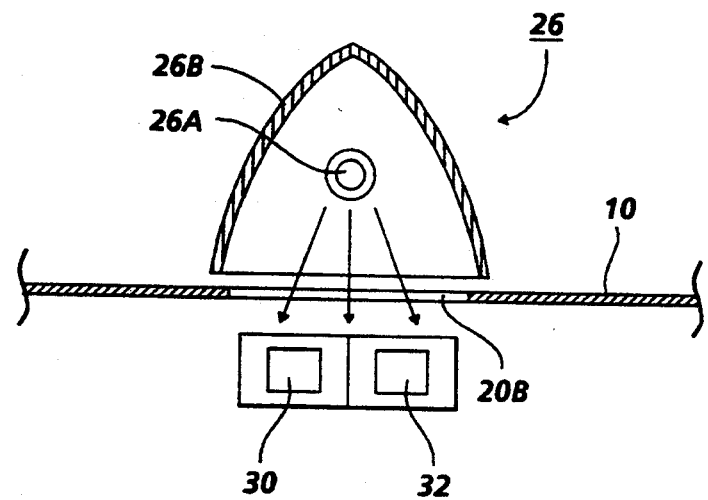
FIG. 3 is a cross-sectional view of the belt velocity sensing mechanism.
Figure 4:
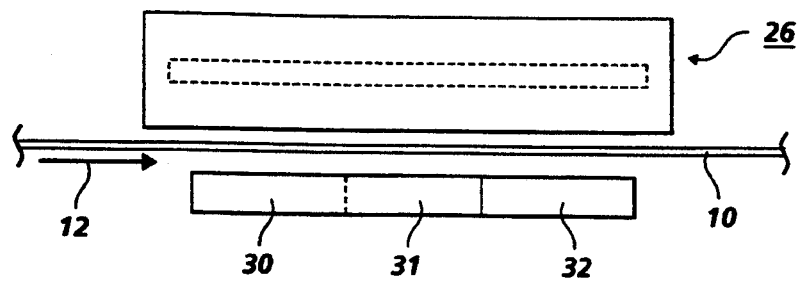
FIG. 4 is a side view of a portion of the belt velocity sensing mechanism.

It is apparent from FIGS. 1–4 that sensor assembly 22 is mounted in a predetermined relation in line with the path of travel of slits 20A–20T such that the sensors 30, 32 have a perpendicular orientation to the slits as the slits are moved therepast. Each slit has a width which is greater than the combined width of the two sensors. Further, the slits are spaced a set distance such that at least one slit is being sensed by one of the sensors at any given time. At one instant of time, one slit will be leaving one edge of the sensor, e.g. sensor 32, while the second slit will be entering the edge of the upstream sensor, e.g. sensor 30. As will be seen, only one slit image can be sensed at any given sensor at one time, but according to the principles of the invention, sensors 30, 32 mechanically overlap forming an overlap area 31, as shown in FIG. 4. The signals from the two sensors are then electronically stitched together. As the slits traverse sensors 30, 32 and the overlap region 31, continuous output signals are produced which represent the belt velocity. This continuous output signal is a differentiated output signal representing changes in photoreceptor velocity over time. This signal is sent to servo control system 16 where it is compared to the commanded or required velocity $V_t$. Correction signals are generated upon detection of a mismatch and sent to motor 14 to adjust the belt velocity.

Figure 5A:
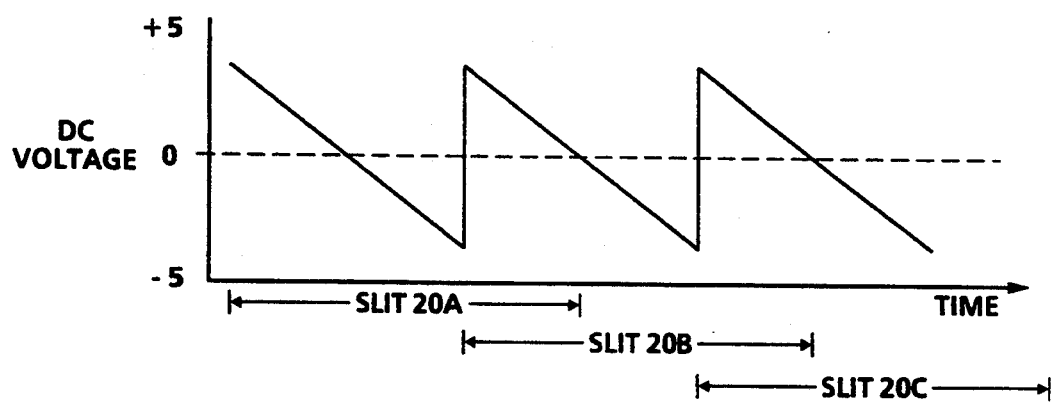
FIG. 5A is a schematic of voltage output levels over time of the position sensors when illuminated by belt slits.
Figure 5B:
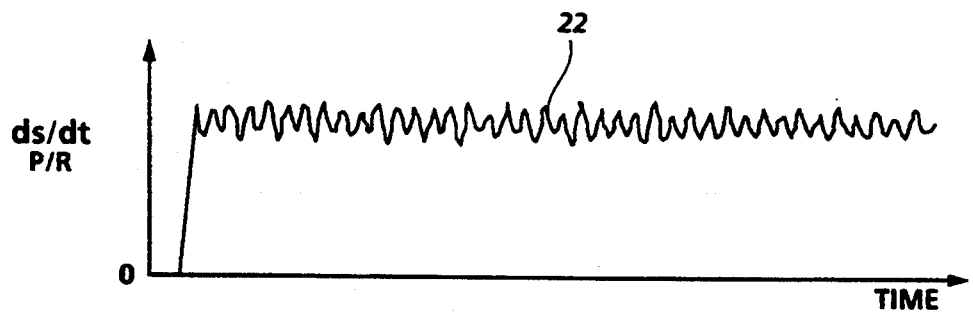
FIG. 5B is a schematic of the combined differentiated output of the voltages shown in FIG. 5A.
Figure 6:
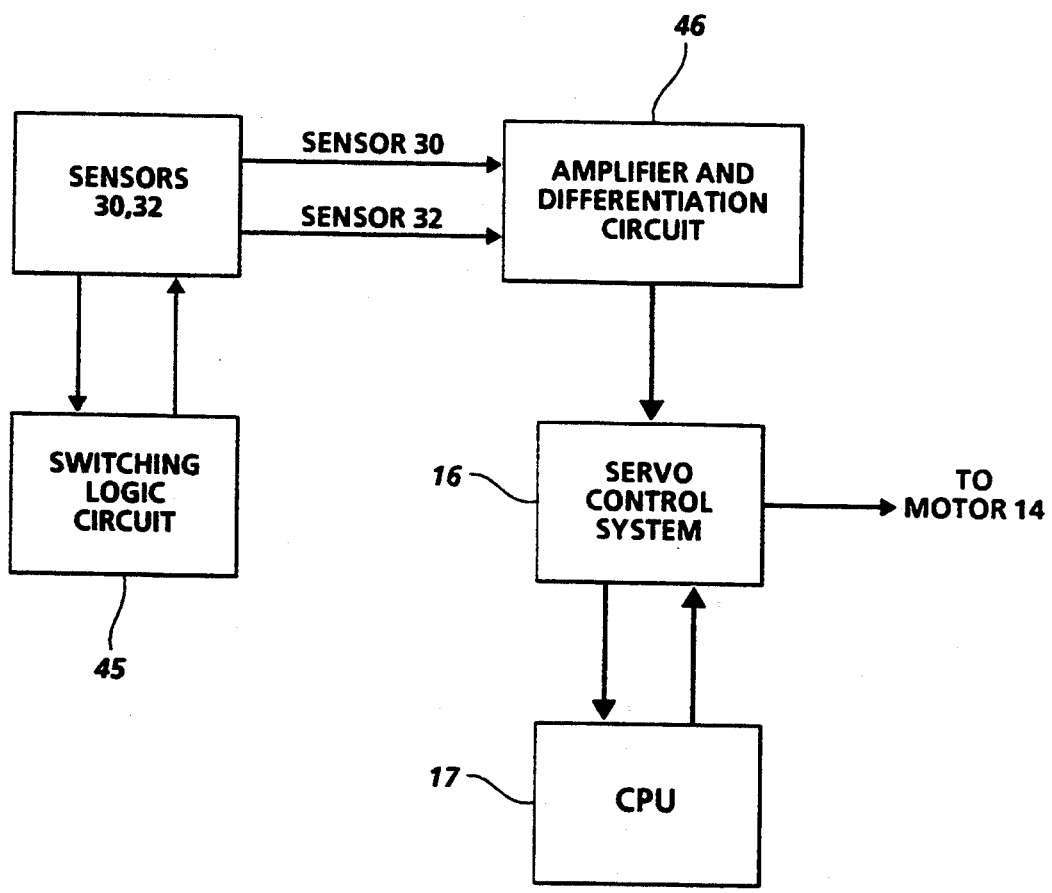
FIG. 6 is a circuit diagram showing the sensor switching logic and the signal differentiation circuitry.

An operational sequence will now be described to more fully illustrate the nature of the belt sensing mechanism. FIG. 5A schematically depicts the analog output voltages over time as the slits 20a, 20c provide a moving band of illumination over the sensor 30, 32 surfaces. FIG. 5B shows the continuous output signal derived from differentiating the outputs of the sensors by the circuit shown in FIG. 6. In the preferred embodiments, slits 20A–20T have a width of 150 $\mu$m. Sensors 30, 32 are UDT PIN SL-76 single axis silicon detectors. To ensure a fast response time, each detector is biased to a level of $\pm 5$ volts. As slit 20A moves into position so that light from LED panel 26A begins to illuminate sensor 30, sensor 30 voltage output has an initial level of close to maximum of 5 volts. As slit 20A moves in the process direction, the voltage output decreases linearly until it reaches a predetermined value, for this case, $-3$ volts. This voltage is selected so that slit 20A is illuminating sensors 30, 32 simultaneously; e.g. the slit 20A is illuminating the overlap region identified as region 31 in FIG. 4. The system switching logic circuit 45 then switches the voltage processing from sensor 30 to that of sensor 32. Thus, sensor 32 will track the photoreceptor motion via slit 20A until the voltage output again decreases to a $-3$ volt level. At this time, slit 20B has begun illuminating sensor 30. Logic circuit 45 then switches again back to the sensor 30. It is understood that this switching operation is repeated as successive slits 20C–20T permit the illumination band to be incident on the sensors. Referring to FIG. 6, the outputs of sensors 30, 32 are sent to an amplifier and differentiation circuit 46 where output pulse signals, shown in FIG. 5B, representing the slope (ds/dt) of the sensed output bar produced are sent to servo control system 16. If sensors 30, 32 have linear and matching outputs, these combined "stitched" signals will be as represented in FIG. 5B. The sensors can be matched by, for example, making the sensors from the same piece of silicone or by measuring the output of the individual sensors and electronically compensating for output differences.

Continuing with the description and again referring to FIG. 6, a differential signal representing belt velocity is compared in servo control circuit 16 to the required velocity $V_t$. Upon detection of some deviation in velocity, a correction signal is generated and sent to motor 14 to either speed up or slow down the belt speed consistent with the sense of the correction signal. The adjusted speed of the belt will be reflected in the outputs of sensors 30, 32, thus completing the feedback loop.

Figure 7:
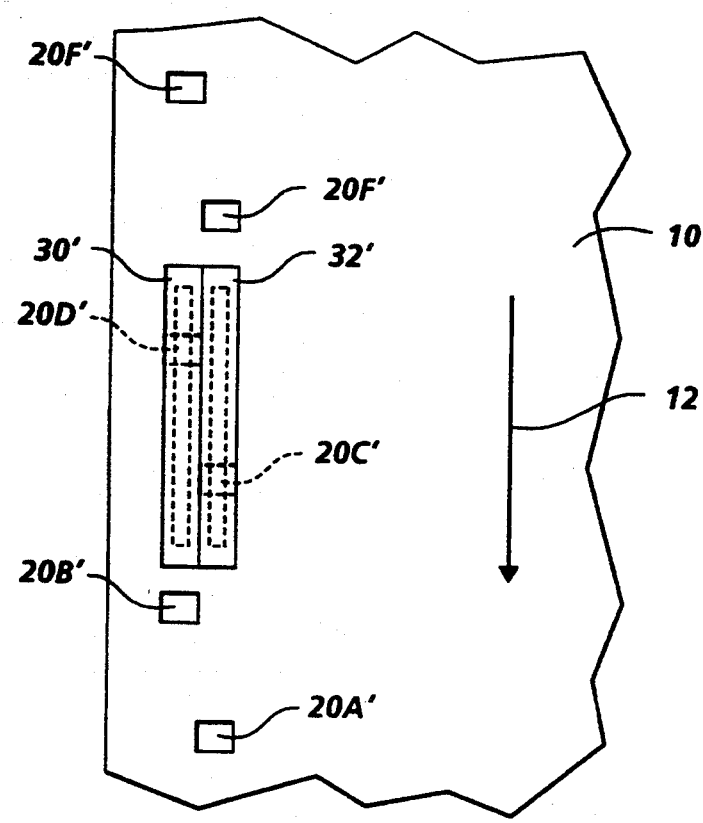
FIG. 7 is a partial top view of the belt velocity sensing mechanism showing an alternate embodiment to that shown in FIG. 2.

While the invention has been shown in the context of measuring the velocity of a belt in a color printer using a photoreceptor belt, the invention is not intended to be limited to the particular embodiment shown. Thus, the sensing arrangement would have utility for measuring velocity of other moving components such as a web or other components in which spaced apertures can be formed and viewed by the combined sensor arrangement. Further, while the preferred embodiment arranges the linear sensors in a staggered array as shown in FIG. 2, the invention can also be practiced with an arrangement of the sensors and slits as shown in FIG. 7. FIG. 7 shows an alternate arrangement whereby the sensors 30', 32' are in parallel (unstaggered) arrangement. Slits 20A' through 20NN' (double the number from the FIG. 2 embodiment) are formed in two parallel rows in a staggered arrangement, each row parallel to the process direction. The slits have a width which is greater than the width of the associated sensor; e.g. slits 20A', 20C', 20E' have a width greater than that of sensor 32. The operational sequence is similar to that described above in connection with the FIG. 2 embodiment.

Other modifications of the present invention may occur to those skilled in the art based upon a reading of the present disclosure and these modifications are intended to be included within the scope of the present invention.

We claim:

1. In a machine incorporating a component which moves at a velocity $V_t$ in a process direction, said component having a series of apertures aligned in a row which is parallel to the process direction, the combination of:

sensing means adjacent to said component for sensing light passing through said apertures and for generating signals representing said velocity $V_t$, said sensing means including a first and second linear position sensor mechanically connected in a staggered orientation so that said first sensor is illuminated through a first moving aperture to provide a first output and said second sensor views said first aperture to produce a second output, means for switching between said first output and said second output, and means for differentiating said first and second output signal to provide a continuous signal representing the velocity $V_t$.

2. A method for measuring the velocity of a web moving in a process direction, the web having a series of apertures aligned in a row which is parallel to the process direction, the method comprising the steps of:

positioning an illumination source along one side of said web so that a band of illumination is directed along said row of apertures, at least two of said apertures being simultaneously illuminated, positioning a first and second linear position sensor adjacent to one surface of said web and aligned with said aperture so as to be optically coupled to said illumination source through said apertures, moving said web in a process direction so as to provide a moving band of illumination along said sensors through said apertures, alternately operating said sensors so that output signals are alternately produced between said sensors, and differentiating said output signals to provide a signal which represents the velocity of said web.

3. In a printer having a photoreceptor belt moving in a process direction, said belt having a series of slits spaced from each other and extending in a row about the circumference of the belt with the length of said slits aligned in a direction generally perpendicular to said process direction, the combination of:

a sensor system for measuring the velocity of said belt, said sensor system including a pair of linear position sensors adjacent one surface of the belt, said sensors constructed in a staggered configuration to provide a continuous length longer than the length of either sensor while shorter than the slit spacing, said sensors aligned so that their lengths are generally parallel to the process direction, and an illumination source positioned on the other side of the belt and adapted to provide a band of illumination which illuminates the length of said slits and the combined length of said sensors, drive means for rotating said belt so as to move said slits across the combined length of said sensors to allow a continuous band of illumination from said light source to fall on said sensors, switching means for switching the operational state of said sensors as a function of the position of said slit and the output voltage of said sensors so that output signals are alternately generated by each sensor, and circuit means for differentiating said sensor output signals to produce a signal representing the velocity of the belt.

4. The printer of claim 3 wherein said sensors are connected so as to have an overlapping region wherein said slit allows illumination of both sensors simultaneously and wherein switching circuit means switch said output state during a time when both sensors are simultaneously illuminated.

5. The printer of claim 4 wherein said switching means also switches said operational state at a time when two slits overlie both ends of the staggered sensors.

6. The printer of claim 3 wherein said sensors are made from the same silicon material.

7. In a machine incorporating a component which moves at a velocity $V_t$ in a process direction, said component having a series of apertures aligned in a first and second row which are parallel to the process direction, the combination of:

sensing means adjacent to said component for sensing light passing through said apertures and for generating signals representing said velocity $V_t$, said sensing means including a first and second linear position sensor mechanically connected so that said first sensor is illuminated through apertures aligned in said first row to provide a first output and said second sensor is illuminated through apertures in said second row to produce a second output, means for switching between said sensor outputs, and means for differentiating said first and second outputs to provide a continuous signal representing the velocity $V_t$.

* * * * *